United States Patent Office 3,452,082
Patented June 24, 1969

3,452,082
ADAMANTYL DIALKYLAMINOALKYL-
CARBAMATES
Carl Peter Krimmel, Wauconda, Ill., assignor to G. D.
Searle & Co., Chicago, Ill., a corporation of Delaware
No Drawing. Filed Apr. 17, 1967, Ser. No. 631,159
Int. Cl. C07c *101/24;* C07d *29/24, 87/36*
U.S. Cl. 260—482                                5 Claims

ABSTRACT OF THE DISCLOSURE

The present adamantyl esters of dialkylaminoalkylcarbamic acids possess activity against a wide variety of organisms including fungi, bacteria, protozoa, and algae. The compounds are prepared by the reaction of adamantyl chloroformate with an appropriate dialkylaminoalkylamine.

SUMMARY OF THE INVENTION

The present invention relates to a group of adamantyl esters of substituted carbamic acids and particularly to carbamate esters having the following general formula

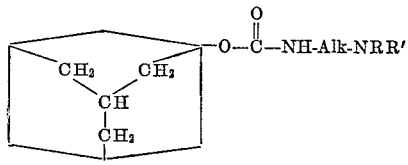

wherein alk is a lower alkylene radical separating the atoms attached thereto by at least 2 carbon atoms; and —NRR' is selected from the group consisting of di(lower alkyl)amino and cyclic amino. Examples of cyclic amino radicals are 1-pyrrolidinyl, piperidino, morpholino, and 4-methyl-1-piperazinyl.

The lower alkylene radicals referred to above contain up to 6 carbon atoms and can be exemplified by radicals such as ethylene, propylene, trimethylene, and tetramethylene. The lower alkyl radicals referred to above likewise contain up to 6 carbon atoms and can be exemplified by radicals such as methyl, ethyl, propyl, isopropyl, and butyl.

The organic bases of this invention form pharmaceutically acceptable salts with a variety of inorganic and strong organic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of this invention are prepared by the reaction of 1-adamantyl chloroformate with an amine of the formula

wherein alk and —NRR' are defined as above, in an inert, anhydrous solvent such as benzene.

The compounds of the present invention are useful because of their anti-biotic activity against a wide variety of organisms. Thus, they inhibit the growth of fungi such as *Trichophyton mentagrophytes* and *Candida albicans*, bacteria such as *Diplococcus pneumoniae*, protozoa such as *Tetrahymena gelleii* and *Trichomonas vaginalis*, and algae such as *Chlorella vulgaris*. The present compounds can thus be combined with various known excipients and adjuvants in the form of dusts, solutions, suspensions, ointments, and sprays to provide compositions useful for disinfecting purposes.

The present compounds additionally possess analgesic activity in that they inhibit the writhing induced in mice by the administration of hydrochloric acid.

The following examples are presented to further illustrate the present invention; they should not be construed as limiting it in spirit or in scope. In these examples, quantities by weight are indicated in grams, quantities by volume are indicated in milliliters, and temperatures are indicated in degrees centigrade (° C.).

Example 1

A solution of 8.4 grams of 5-diethylaminopentylamine is dissolved in 50 ml. of anhydrous benzene and added, with stirring, to 11.4 grams of 1-adamantyl chloroformate dissolved in 122 ml. of anhydrous benzene. This reaction mixture is refluxed on a steam bath for 2 hours. It is then cooled and washed successively with dilute potassium carbonate solution and distilled water. The washed benzene solution is then dried over anhydrous sodium sulfate and the benzene is evaporated under reduced pressure. Distillation under reduced pressure is then continued to give 1-adamantyl 5-diethylaminopentylcarbamate as a pale yellow viscous oil boiling at about 220–231° C. at 3.5 mm. pressure. This compound has the following formula

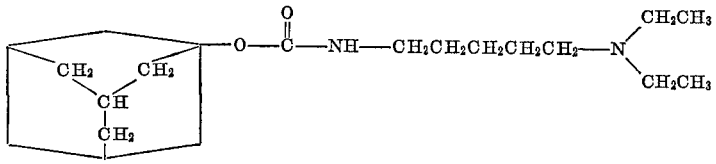

Example 2

To a solution of 1.0 gram of 1-adamantyl 5-diethylaminopentylcarbamate in 100 ml. of anhydrous ethyl ether, there is added, with stirring, a solution of 0.3 gram of oxalic acid in 100 ml. of anhydrous ethyl ether. A powdery white precipitate forms but the mixture is allowed to stand for 5 minutes before it is filtered. The solid is then washed with anhydrous ethyl ether to give 1-adamantyl 5-diethylaminopentylcarbamate oxalate melting at about 129–134° C.

Example 3

A mixture of 2.0 grams of 1-adamantyl 5-diethylaminopentylcarbamate and 3.3 grams of ethyl bromide in 10 ml. of 2-butanone is refluxed on a steam bath for 4 hours. A granular white crystalline solid forms and is separated by filtration and washed with 10 ml. of 2-butanone. The solid is then dried in a steam cabinet to give 1-adamantyl 5- diethylaminopentylcarbamate ethobromide melting at about 165–168° C.

Example 4

A solution of 7.2 grams of 2-diethylaminoethylamine in 50 ml. of anhydrous benzene is reacted with 11.4 grams of 1-adamantyl chloroformate in 122 ml. of anhydrous benzene according to the procedure described in Example 1. The product, obtained as a pale yellow oil boiling at 168–174° C. at 1.0 mm. pressure, is 1-adamantyl 2-diethylaminoethylcarbamate.

Example 5

To a solution of 2.0 grams of 1-adamantyl 2-diethylaminoethylcarbamate in 30 ml. of 2-butanone, there is added, with stirring, 1.5 ml. of a 2-propanol solution of anhydrous hydrogen chloride containing 0.26 gram of hydrogen chloride per milliliter. A white precipitate forms and this is separated by filtration, washed with 2-butanone and dried in a steam cabinet. The product obtained in this way is 1-adamantyl 2-diethylaminoethylcarbamate hydrochloride melting at about 200–201° C. The addition of 5 mg. of this compound to an agar plate inoculated with *Candida albicans* inhibits the growth of this organism.

Example 6

A mixture of 2.1 grams of 1-adamantyl 2-diethylaminoethylcarbamate, 3.1 grams of ethyl bromide and 20 ml. of butanone is refluxed on a steam bath for 1.5 hours. A second portion of 3.1 grams of ethyl bromide is then added to the mixture and refluxing is resumed for an additional 1.5 hours. The mixture is then allowed to stand at room temperature for 18 hours. The crystalline precipitate which forms is separated by filtration and washed with 2-butanone. It is then dried in a vacuum desiccator to give 1-adamantyl 2-diethylaminoethylcarbamate ethobromide melting at about 193–200° C.

Example 7

3-dimethylaminopropylamine, 1-(3-aminopropyl)-pyrrolidine, 1-(2-aminoethyl)piperidine, 4-(2-aminoethyl)-morpholine, and 1-(3-aminopropyl)-4-methylpiperazine are each reacted with 1-adamantyl chloroformate according to the procedure described in Example 1 to give, respectively, adamantyl 3-dimethylaminopropylcarbamate, 1-adamantyl 3-(1-pyrrolidinyl)propylcarbamate, 1-adamantyl 3-piperidinoethylcarbamate, 1-adamantyl 2-morpholinoethylcarbamate, and 1-adamantyl 3-(4-methyl-1-piperazinyl)propylcarbamate.

What is claimed is:

1. A member selected from the group consisting of compounds of the formula

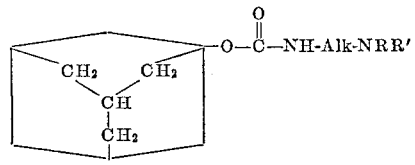

wherein alk is lower alkylene separating the nitrogens attached thereto by at least 2 carbon atoms; and —NRR′ is selected from the group consisting of di(lower alkyl) amino, 1-pyrrolidinyl, piperidino, morpholino, and 4-methyl-1-piperazinyl; and the acid addition and alkyl halide quaternary ammonium salts thereof.

2. A compound according to claim 1 which has the formula

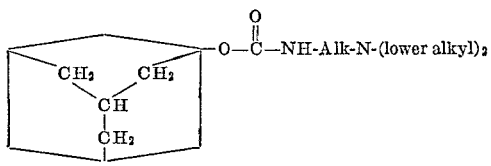

wherein alk is lower alkylene separating the nitrogens attached thereto by at least 2 carbon atoms.

3. A compound according to claim 1 which is 1-adamantyl 2-diethylaminoethylcarbamate.

4. A compound according to claim 1 which is 1-adamantyl 2-diethylaminoethylcarbamate ethobromide.

5. A compound according to claim 1 which is 1-adamantyl 5-diethylaminopentylcarbamate.

References Cited

UNITED STATES PATENTS 3,345,399  10/1967  Gerzon et al. ____ 260—482 XR
3,369,041  2/1968  Gerzon et al. _____ 260—482

LORRAINE A. WEINBERGER, *Primary Examiner.*

A. P. HALLUIN, *Assistant Examiner.*

U.S. Cl. X.R.

260—247.2, 268, 326.3, 294.3, 999